(12) United States Patent
Suzuki et al.

(10) Patent No.: US 10,844,773 B2
(45) Date of Patent: Nov. 24, 2020

(54) HEAT EXCHANGER

(71) Applicant: DENSO CORPORATION, Kariya (JP)

(72) Inventors: Kazutaka Suzuki, Kariya (JP); Michiya Takatsuka, Kariya (JP)

(73) Assignee: DENSO CORPORATION, Kariya (JP)

( * ) Notice: Subject to any disclaimer, the term of this patent is extended or adjusted under 35 U.S.C. 154(b) by 203 days.

(21) Appl. No.: 16/094,481

(22) PCT Filed: Mar. 13, 2017

(86) PCT No.: PCT/JP2017/009858
§ 371 (c)(1),
(2) Date: Oct. 18, 2018

(87) PCT Pub. No.: WO2017/183356
PCT Pub. Date: Oct. 26, 2017

(65) Prior Publication Data
US 2019/0120124 A1    Apr. 25, 2019

(30) Foreign Application Priority Data

Apr. 20, 2016  (JP) .................................. 2016-084145

(51) Int. Cl.
| F02B 29/04 | (2006.01) |
| F28F 9/04 | (2006.01) |
| F28D 7/16 | (2006.01) |
| F28F 9/00 | (2006.01) |
| F28D 9/00 | (2006.01) |

(52) U.S. Cl.
CPC .......... *F02B 29/0462* (2013.01); *F02B 29/04* (2013.01); *F02B 29/0475* (2013.01); *F28D 7/16* (2013.01); *F28F 9/00* (2013.01); *F28F 9/001* (2013.01); *F28F 9/04* (2013.01); *F28D 9/0043* (2013.01); *Y02T 10/12* (2013.01)

(58) Field of Classification Search
CPC .. F02B 29/0462; F02B 29/04; F02B 29/0475; F28F 9/00; F28F 9/001; F28F 9/04; F28D 7/16; F28D 9/0043; Y02T 10/146
See application file for complete search history.

(56) References Cited

U.S. PATENT DOCUMENTS

| 9,097,466 | B2 | 8/2015 | Braic et al. |
| 9,127,895 | B2* | 9/2015 | Neher .................... F28D 7/1684 |
| 2006/0185833 | A1 | 8/2006 | Brost et al. |
| 2008/0156472 | A1* | 7/2008 | Maucher ................ F02M 26/32 |
| | | | 165/166 |
| 2009/0014153 | A1* | 1/2009 | Pimentel ............. F02B 29/0462 |
| | | | 165/67 |

(Continued)

FOREIGN PATENT DOCUMENTS

| DE | 10103584 A1 | 8/2002 |
| DE | 102005008409 A1 | 8/2006 |

(Continued)

*Primary Examiner* — Ljiljana V. Ciric
(74) *Attorney, Agent, or Firm* — Harness, Dickey & Pierce, P.L.C.

(57) ABSTRACT

A heat exchanger includes crimping plates fixed to an inlet and an outlet of a duct and having frame shapes corresponding to opening shapes of the inlet and the outlet. Each of the crimping plates includes a beam connecting two different positions on an inner periphery of the crimping plate. The beam has a rib.

11 Claims, 13 Drawing Sheets

(56) References Cited

U.S. PATENT DOCUMENTS

| | | | |
|---|---|---|---|
| 2010/0089548 A1 | 4/2010 | Braic et al. | |
| 2010/0282449 A1 | 11/2010 | Merklein et al. | |
| 2011/0120671 A1* | 5/2011 | Brauning | F28F 21/06 |
| | | | 165/96 |
| 2011/0168364 A1 | 7/2011 | Okuyama et al. | |
| 2013/0264039 A1* | 10/2013 | Kis | F01P 1/00 |
| | | | 165/173 |
| 2013/0299147 A1 | 11/2013 | Ghiani | |
| 2013/0299151 A1 | 11/2013 | Gregus-Kollar et al. | |
| 2013/0333867 A1* | 12/2013 | Moreau | B21D 39/02 |
| | | | 165/164 |
| 2014/0196876 A1* | 7/2014 | Riondet | B23P 15/26 |
| | | | 165/173 |
| 2015/0168080 A1 | 6/2015 | Honma et al. | |
| 2015/0292819 A1* | 10/2015 | Woollen | F28F 9/001 |
| | | | 165/157 |
| 2016/0025418 A1* | 1/2016 | Devedeux | F02B 29/0462 |
| | | | 165/166 |
| 2016/0258693 A1 | 9/2016 | Mabuchi et al. | |
| 2016/0370131 A1* | 12/2016 | Hermida Dom Nguez | |
| | | | F28D 7/16 |
| 2017/0115069 A1* | 4/2017 | Ferrand | F28F 9/0226 |
| 2018/0023898 A1 | 1/2018 | Saitou et al. | |
| 2018/0292142 A1* | 10/2018 | Schouten | F28F 13/12 |
| 2018/0351305 A1* | 12/2018 | Maesoba | H01R 13/6581 |
| 2019/0120561 A1* | 4/2019 | Suzuki | F28F 9/02 |

FOREIGN PATENT DOCUMENTS

| | | |
|---|---|---|
| DE | 102008018594 A1 | 10/2008 |
| DE | 102012206982 A1 | 10/2013 |
| JP | S62112492 U | 7/1987 |
| JP | H03046776 U | 4/1991 |
| JP | 2011191038 A | 9/2011 |
| JP | 2013238391 A | 11/2013 |
| JP | 2014020669 A | 2/2014 |
| JP | 2015087055 A | 5/2015 |
| WO | WO-2008034829 A1 | 3/2008 |
| WO | WO-2015/064093 A1 | 5/2015 |

* cited by examiner

HEAT EXCHANGER

CROSS REFERENCE TO RELATED APPLICATIONS

This application is a U.S. National Phase Application under 35 U.S.C. 371 of International Application No. PCT/JP2017/009858 filed on Mar. 13, 2017. This application is based on and claims the benefit of priority from Japanese Patent Application No. 2016-084145 filed on Apr. 20, 2016. The entire disclosures of all of the above applications are incorporated herein by reference.

TECHNICAL FIELD

The present disclosure relates to a heat exchanger including a core housed in a duct.

BACKGROUND ART

Conventionally, a heat exchanger including a heat exchanging unit having intake passages and tanks connected to the intake passages is proposed in Patent Literature 1, for example. The tanks are fixed to the heat exchanging unit by plates as connecting parts having frame shapes.

PRIOR ART LITERATURE

Patent Literature

Patent Literature 1: WO 2008/034829 A1

SUMMARY OF INVENTION

Here, a configuration with the tanks crimping-fixed to the plates by plastically deforming parts of the plates is conceivable. In other words, the configuration with the heat exchanging unit having the crimping plates is conceivable. The crimping is performed by applying a crimping load toward each of the tanks via each of the crimping plates.

However, with the configuration in which an inner peripheral face or a bottom face of each of the crimping plates is joined to the heat exchanging unit by brazing or the like, it is impossible to receive the crimping load applied in a direction toward an inside of each of the tanks. This is because there is no clearance for a support that supports the crimping load between each of the crimping plates and the heat exchanging unit.

As a result, the crimping load is transferred from an outer face of the crimping plate that receives the crimping load to the tank and then to an inner face of the crimping plate fixed to the heat exchanging unit to thereby deform the heat exchanging unit. Therefore, deformation of each of the crimping plates and buckling of fins at outermost portions of a core forming the heat exchanging unit occur, which may result in reduction in pressure resistance of the core.

In view of the above-described points, it is an objective of the present disclosure to provide a heat exchanger capable of suppressing deformation of a core in crimping.

According to a first aspect of the present disclosure, a heat exchanger includes: a duct configured to receive first fluid through an inlet and emit the first fluid through an outlet; a core housed in the duct and configured to be capable of exchanging heat between second fluid and the first fluid flowing through the duct; crimping plates fixed to the inlet and the outlet and having frame shapes corresponding to opening shapes of the inlet and the outlet; and tanks crimping-fixed to the crimping plates.

Each of the crimping plates includes a beam connecting two different positions on an inner periphery of the crimping plate. The beam has a rib protruding in one or both of directions toward and away from the core.

In this way, the rib increases a modulus of section of the beam, and therefore, rigidity of the beam improves. As a result, even if a crimping load is applied to each of the crimping plates in crimping each of the tanks to the crimping plate, the beam is less liable to be deformed. Therefore, it is possible to suppress deformation of the core in the crimping.

According to a second aspect of the present disclosure, a heat exchanger includes: a duct configured to receive first fluid through an inlet and emit the first fluid through an outlet; a core housed in the duct and configured to be capable of exchanging heat between second fluid and the first fluid flowing through the duct; crimping plates fixed to the inlet and the outlet and having frame shapes corresponding to opening shapes of the inlet and the outlet; and tanks crimping-fixed to the crimping plates. Each of the tanks includes an opening that faces the crimping plates, and an outer periphery including peaks and valleys alternately provided on an outer circumferential surface of the opening in a circumferential direction of the opening.

Each of the crimping plates includes: a beam connecting two different positions on an inner periphery of the crimping plate; and a wave-crimping part covering the outer periphery and having a wave shape in which portions corresponding to the valleys have shapes corresponding to shapes of the valleys, the wave shape causing the outer periphery to be crimping-fixed.

The wave-crimping part has an edge facing away from the core, and has a notch recessed from the edge toward the core, the notch being positioned within one of the portions corresponding to the valleys and having a narrower width than a crimping claw width of the portion corresponding to the valley.

In this way, since the notch is provided to the portion of the wave-crimping part corresponding to the valley, an amount of the wave-crimping part to be pushed in the crimping reduces, which reduces the crimping load. As a result, the crimping load becomes less likely to be transferred from the wave-crimping part to the beam via an inner periphery. Therefore, it is possible to suppress deformation of the beam provided to each of the crimping plates, and it is possible to suppress deformation of the core in the crimping.

According to a third aspect of the present disclosure, a heat exchanger includes: a duct configured to receive first fluid through an inlet and emit the first fluid through an outlet; a core housed in the duct and configured to be capable of exchanging heat between second fluid and the first fluid flowing through the duct; crimping plates fixed to the inlet and the outlet and having in frame shapes corresponding to opening shapes of the inlet and the outlet; and tanks crimping-fixed to the crimping plates. Each of the tanks includes an opening that faces the crimping plates, and an outer periphery including peaks and valleys alternately provided on an outer circumferential surface of the opening in a circumferential direction of the opening. Each of the crimping plates includes: a beam connecting two different positions on an inner periphery of the crimping plate; and a wave-crimping part covering the outer periphery and having a wave shape in which portions corresponding to the valleys have shapes corresponding to shapes of the valley, the wave shape causing the outer periphery to be crimping-fixed.

Sectional shape of the peaks on a plane perpendicular to a facing direction of the opening are pointed at vertexes that are in contact with the wave-crimping part.

In this way, when the crimping load is applied to the portions of the wave-crimping part corresponding to the valleys, stress becomes likely to be concentrated on portions of the wave-crimping part that come in contact with the vertexes of the peaks. In other words, the portions of the wave-crimping part that come in contact with the vertex of the peak become likely to be deformed, and therefore it is possible to reduce the crimping load applied to the wave-crimping part. As a result, the crimping load becomes less likely to be transferred from the wave-crimping part to the beam via an inner periphery. Therefore, it is possible to suppress deformation of the beam provided to each of the crimping plates, and it is possible to suppress deformation of the core in the crimping.

DETAILED DESCRIPTION

Figure 1:
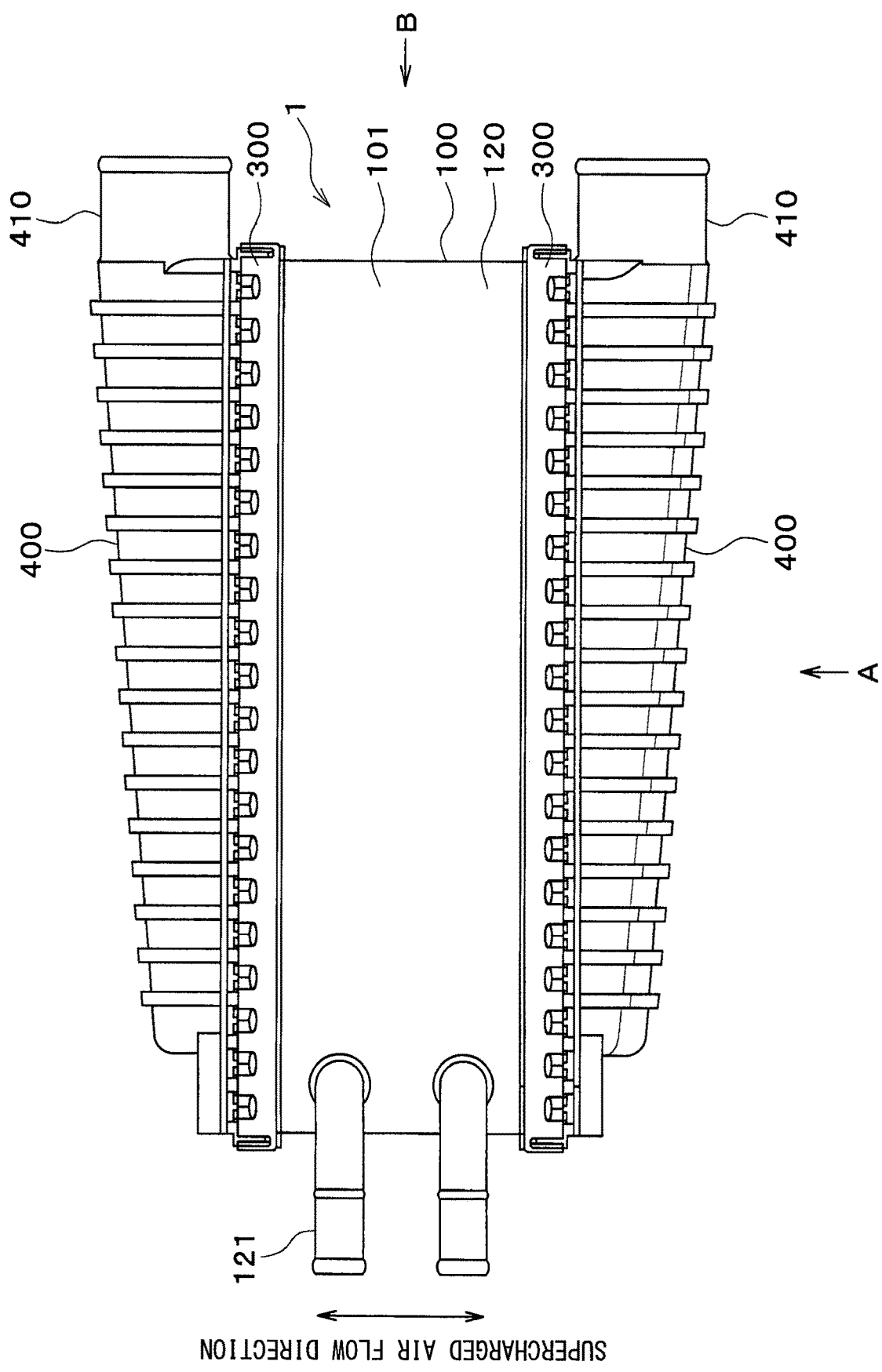
FIG. 1 is a plan view of a heat exchanger according to a first embodiment of the present disclosure.
Figure 2:
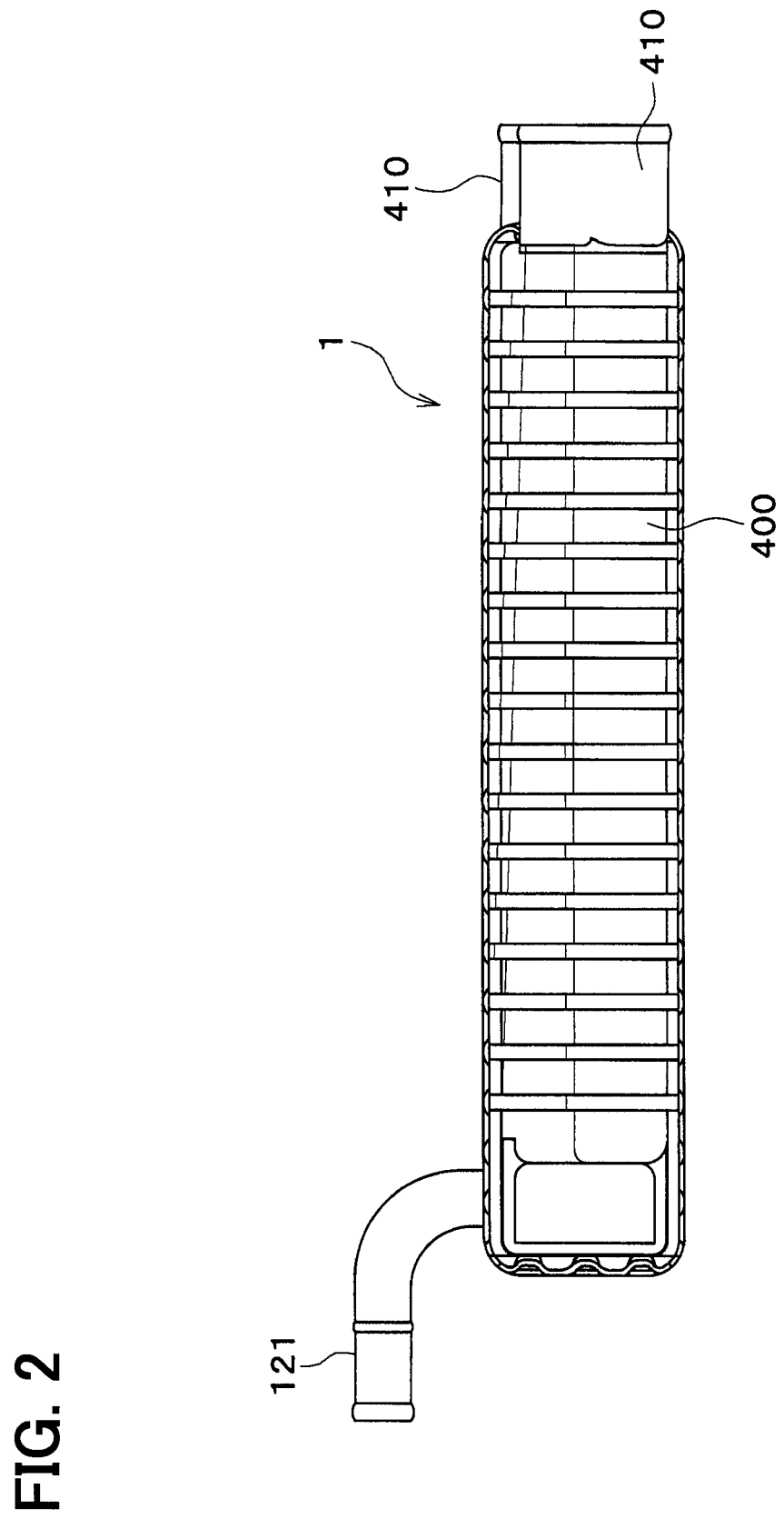
FIG. 2 is a view in a direction of arrow A in FIG. 1.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment of the present disclosure will be described below with reference to the drawings. A heat exchanger according to the present embodiment is used as a water-cooled intercooler that causes supercharged air pressurized by a supercharger and increased in temperature and cooling water to exchange heat with each other to thereby cool intake air.

As shown in FIGS. 1 to 6, the heat exchanger 1 includes a duct 100, a core 200, crimping plates 300, and tanks 400.

Figure 3:
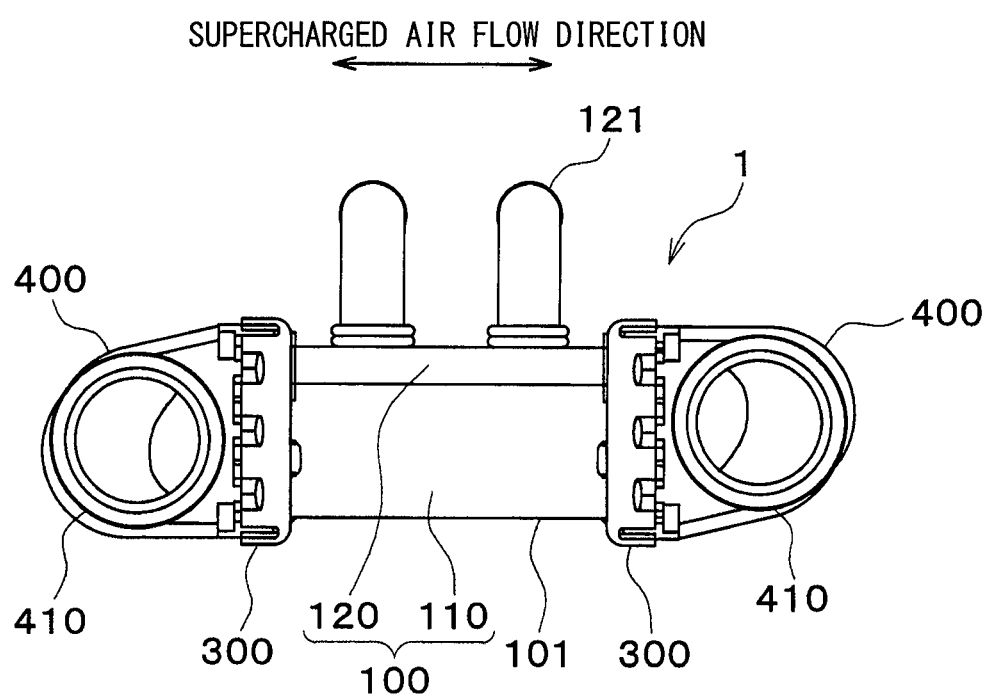
FIG. 3 is a view in a direction of arrow B in FIG. 1.

The duct 100 is a part which has a cylindrical shape and through which the supercharged air as first fluid flows. As shown in FIG. 3, the duct 100 is formed by assembling a first duct plate 110 and a second duct plate 120 into the cylindrical shape, the first duct plate 110 and the second duct plate 120 being formed by pressing thin metal plates made of aluminum or the like into predetermined shapes.

Figure 4:
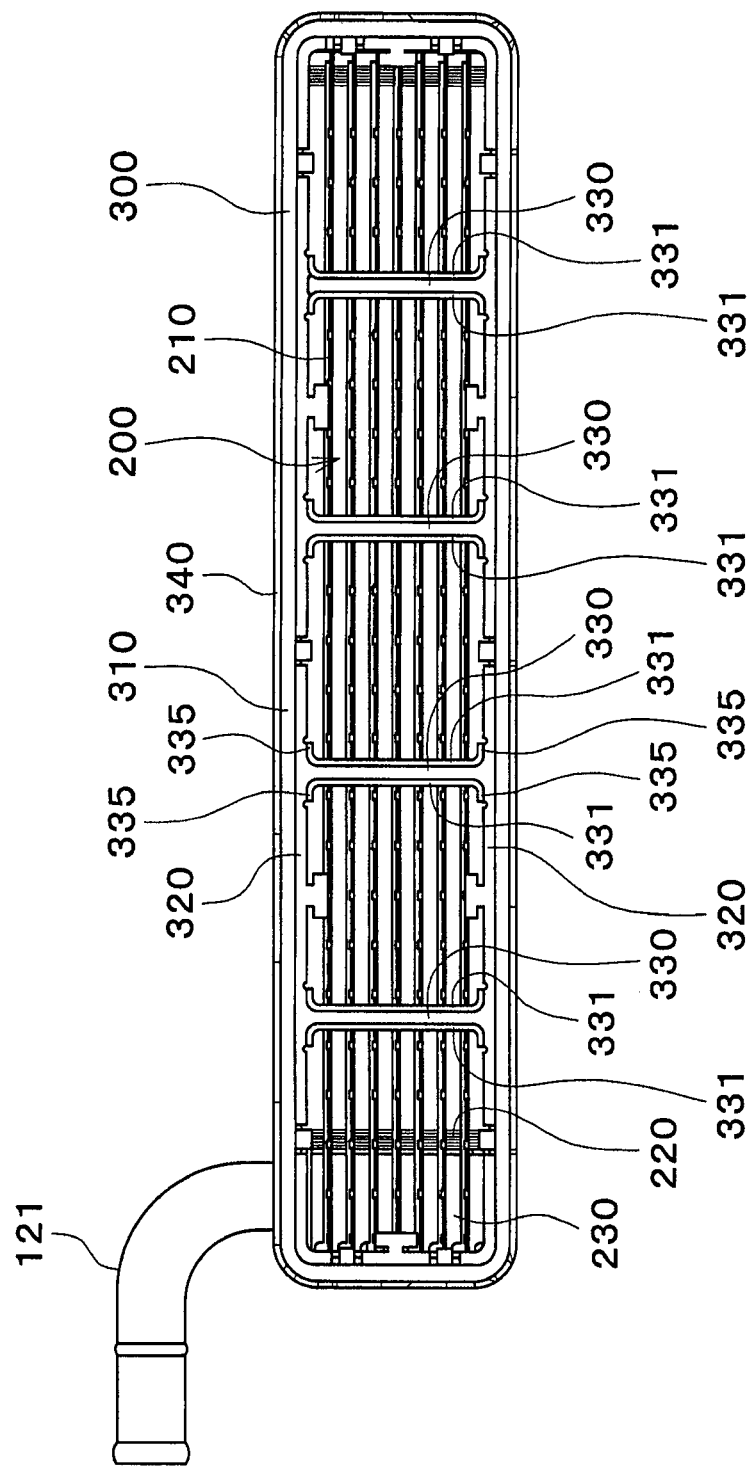
FIG. 4 is a view in the direction of arrow A in FIG. 1 and not showing a tank.

The duct 100 is configured to introduce the supercharged air from an inlet and emit the supercharged air from an outlet. Therefore, the supercharged air flows from the inlet of the duct 100 into intake air flow paths in the duct 100. The supercharged air flows through the intake air flow paths and flows outside from the outlet of the duct 100. In other words, as shown in FIGS. 1 and 3, the supercharged air flows inside the duct 100 along a supercharged air flow direction. As shown in FIG. 4, the inlet and the outlet of the duct 100 are formed in substantially rectangular shapes.

The second duct plate 120 has a cooling water-side pipe 121 connected to piping (not shown) through which the cooling water as second fluid flows. The heat exchanger 1 is connected, by the piping, to a heat exchanger (not shown) that cools the cooling water.

The core 200 is a heat exchanging unit that causes the cooling water and the supercharged air flowing through the duct 100 to exchange heat with each other. The core 200 is housed in the duct 100. The core 200 is formed by a metal member made of aluminum or the like.

Specifically, as shown in FIG. 4, the core 200 is formed by alternately layering cooling plates 210 and outer fins 220 with spacer plates 230 interposed therebetween. The cooling plates 210 form flow paths through which the cooling water flows. Each of the flow paths includes, inside itself, inner fins (not shown) that increase a heat transfer area to thereby facilitate heat exchange.

The supercharged air passes between the cooling plates 210 and the spacer plates. On the other hand, the cooling water flows into or out of the flow paths formed by the cooling plates 210 via the cooling water-side pipe 121. In this way, the core 200 causes the supercharged air and the cooling water to exchange heat with each other.

The crimping plates 300 are intermediate parts that fix the duct 100 while maintaining the duct 100 in the cylindrical shape and fix the tanks 400. Each of the crimping plates 300 is formed by pressing a thin metal plate made of aluminum or the like. The crimping plates 300 are formed as frames having rectangular shapes respectively corresponding to opening shapes of the inlet and the outlet of the duct 100. The crimping plates 300 are fixed to the inlet and the outlet of the duct 100, respectively.

Figure 5:
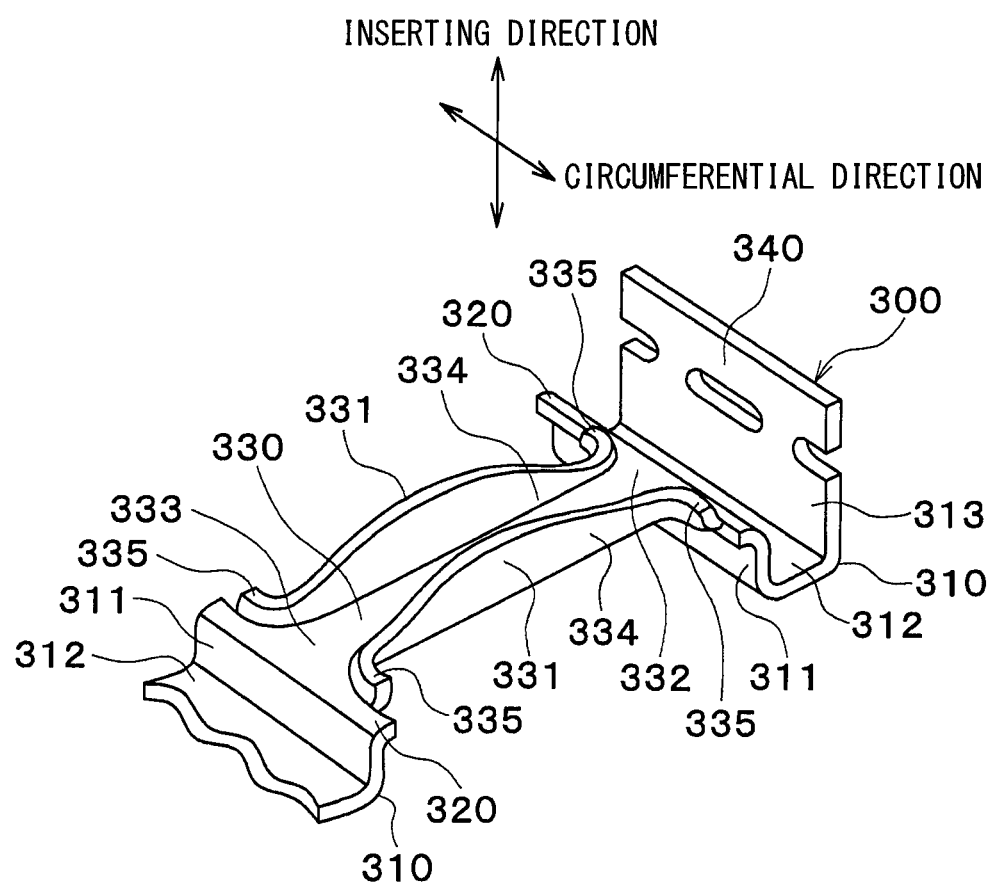
FIG. 5 is a perspective view of a beam of the heat exchanger according to the first embodiment.

As shown in FIG. 5, each of the crimping plates 300 includes a groove 310, an inner periphery 320, beams 330, and a wave-crimping part 340.

The groove 310 is a portion that is recessed along the inlet or the outlet of the duct 100 toward the duct 100 and into which opening 420 of each of the tanks 400 is inserted.

The groove 310 has a side wall 311, a bottom wall 312, and an outer wall 313. The side wall 311 is a portion having a cylindrical shape and fixed to an outer wall face 101 of the duct 100. The bottom wall 312 is a portion connected to the side wall 311 and forming a bottom of the groove 310. The outer wall 313 is a portion connected to the bottom wall 312 and extending substantially parallel to the side wall 311.

The inner periphery 320 is a portion connected to the side wall 311 of the groove 310 and bent at about 90 degrees to the side wall 311.

Each of the beams 330 is a portion that connects two different positions on the inner periphery 320. The beams 330 connect one long side and the other long side of the crimping plate 300. In the present embodiment, the four beams 330 are provided to each of the crimping plates 300. The beams 330 perform a function of preventing distortion or deformation of the crimping plate 300 after the crimping plate 300 is formed by the pressing.

Each of the beams 330 has ribs 331 protruding in a direction away from the core 200. In other words, each of the beams 330 has the ribs 331 protruding toward the tank 400 along opening directions of the inlet and the outlet of the tank 400, i.e., the supercharged air flow direction. The ribs 331 perform a function of increasing a modulus of section of the beam 330 to thereby reinforce the beam 330.

In the present embodiment, the ribs 331 are formed continuously from one end portion 332 to the other end portion 333 of the beam 330 connected to the inner periphery 320. In this way, it is possible to increase rigidity of the entire beam 330. The ribs 331 are formed by inclining outer edges 334 of the beam 330. Specifically, the ribs 331 are portions formed by bending the outer edges 334 of the beam 330 at substantially 90 degrees to a main body portion.

In the present embodiment, widths of the ribs 331 in an inserting direction of the tank 400 into the groove 310 are the largest at intermediate portions and decrease toward the one end portion 332 and the other end portion 333. In other words, the ribs 331 are formed in oval semicircular shapes. In this way, it is possible to increase rigidity of portions of the beam 330 corresponding to the intermediate portions of the ribs 331 as compared with rigidity of ends of the ribs 331.

Furthermore, each of the outer edges 334 has rounded parts 335 in shapes rounded (curved) in a circumferential direction of the inner periphery 320 of the crimping plate 300 and connected to the inner periphery 320. In this way, the rounded parts 335 can reinforce bases of the beam 330 connected to the inner periphery 320. Moreover, it is possible to increase strength of the bases.

The wave-crimping part 340 is a portion for crimping of the tank 400 to the crimping plate 300. The wave-crimping part 340 is connected to the outer wall 313 of the groove 310. FIGS. 4 and 5 show a shape of the wave-crimping part 340 before the wave-crimping part 340 is deformed. The crimping will be described later.

The duct 100, the core 200, respective parts forming the core 200, and the crimping plates 300 are joined to each other to be integrated by brazing.

Figure 6:
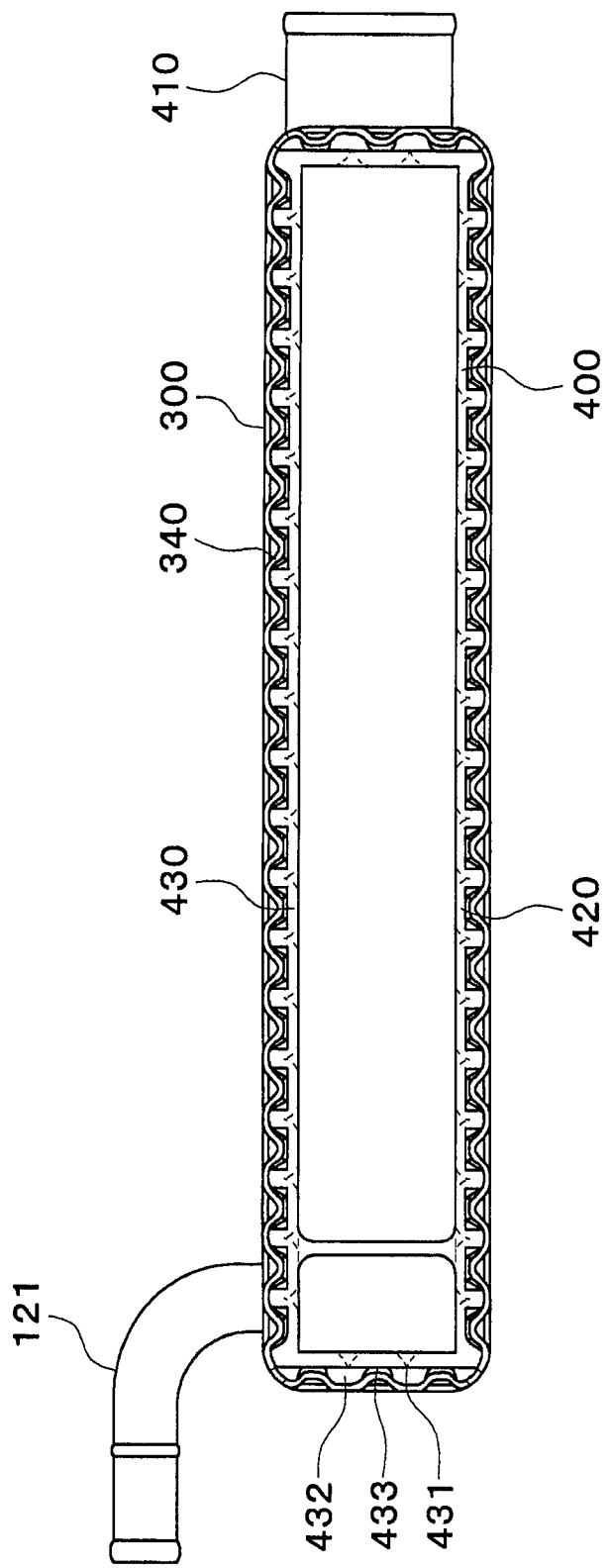
FIG. 6 is a view in the direction of arrow A in FIG. 1 and not showing other parts of the tank than an opening.

Each of the tanks 400 is piping through which the supercharged air flows. Each of the tanks 400 is disposed on an opposite side of the crimping plate 300 from the duct 100 and the core 200. As shown in FIG. 6, the tank 400 includes a supercharged air-side pipe 410, the opening 420, and an outer periphery 430.

The supercharged air-side pipe 410 serves as an inlet/outlet of the tank 400 for the supercharged air. The supercharged air-side pipe 410 is connected to the supercharger by piping (not shown).

The opening 420 is inserted into the groove 310 of the crimping plate 300. The outer periphery 430 is a portion of the opening 420 corresponding to the wave-crimping part 340 of the crimping plate 300. The entire outer periphery 430 is wave-crimped by the wave-crimping part 340. In FIG. 6, a side of the tank 400 opposite from the core 200 is not shown. Moreover, a configuration of the core 200 is not shown.

Figure 7:
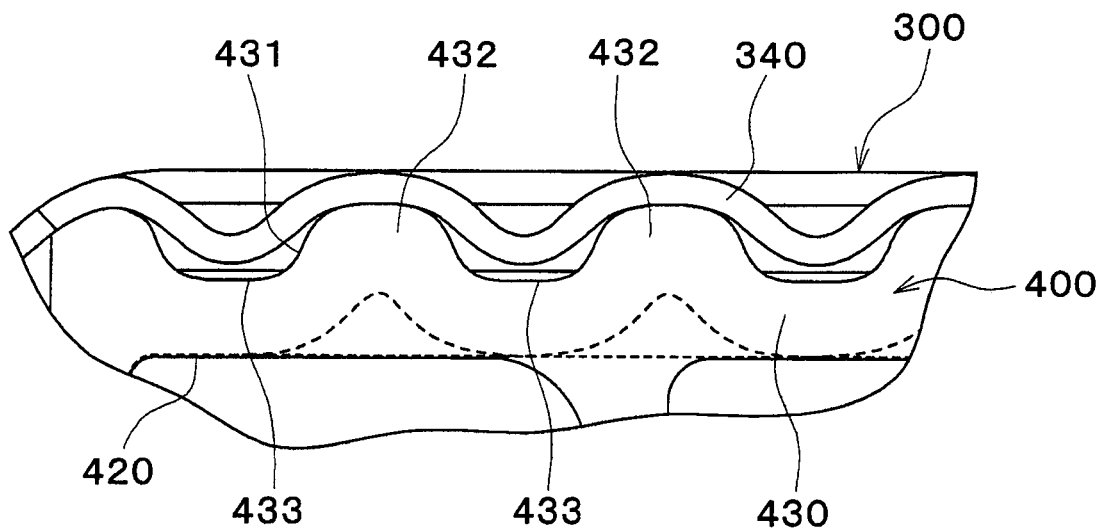
FIG. 7 is a partial enlarged view of a wave-crimping part shown in FIG. 6.

The outer periphery 430 is an outer wall portion of the opening 420. As shown in FIG. 7, the outer periphery 430 has peaks 432 and valleys 433 formed on an outer circumferential surface 431 of the opening 420. The peaks 432 and the valleys 433 are arranged alternately in the circumferential direction of the opening 420.

The wave-crimping part 340 covers the outer periphery 430 of the tank 400, and portions of the wave-crimping part 340 corresponding to the valleys 433 have shapes corresponding to the valleys 433. In this way, the wave-crimping part 340 crimps the entire outer periphery 430 in wave shapes.

Figure 8:
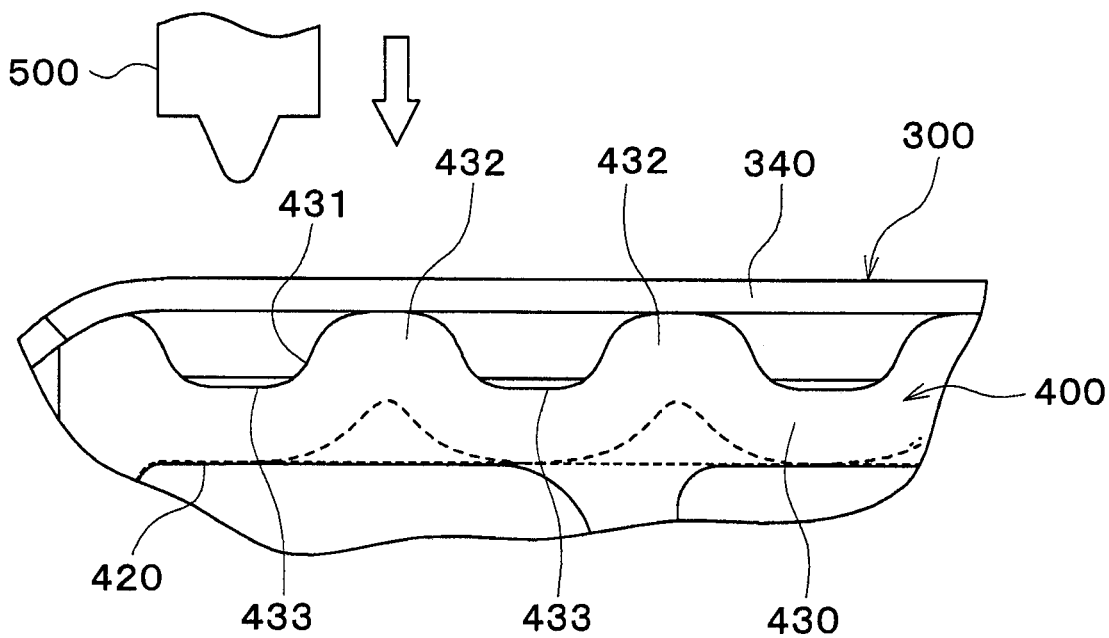
FIG. 8 is a view showing how the wave-crimping part is crimped to the tank.

The crimping is performed in the following manner. First, as shown in FIG. 8, the tank 400 is inserted into the crimping plate 300, and the outer periphery 430 is covered with the wave-crimping part 340. Then, the portion of the wave-crimping part 340 corresponding to the valley 433 is pushed toward the valley 433 by a punch 500. As a result, the portion of the wave-crimping part 340 corresponding to the valley 433 is deformed toward the valley 433.

Then, the portions of the wave-crimping part corresponding to all of the valleys 433 are pushed toward the valleys 433 by the punch 500. In this way, as shown in FIG. 6, the tank 400 is crimped to the crimping plate 300. The above is the entire configuration of the heat exchanger 1.

Figure 9:
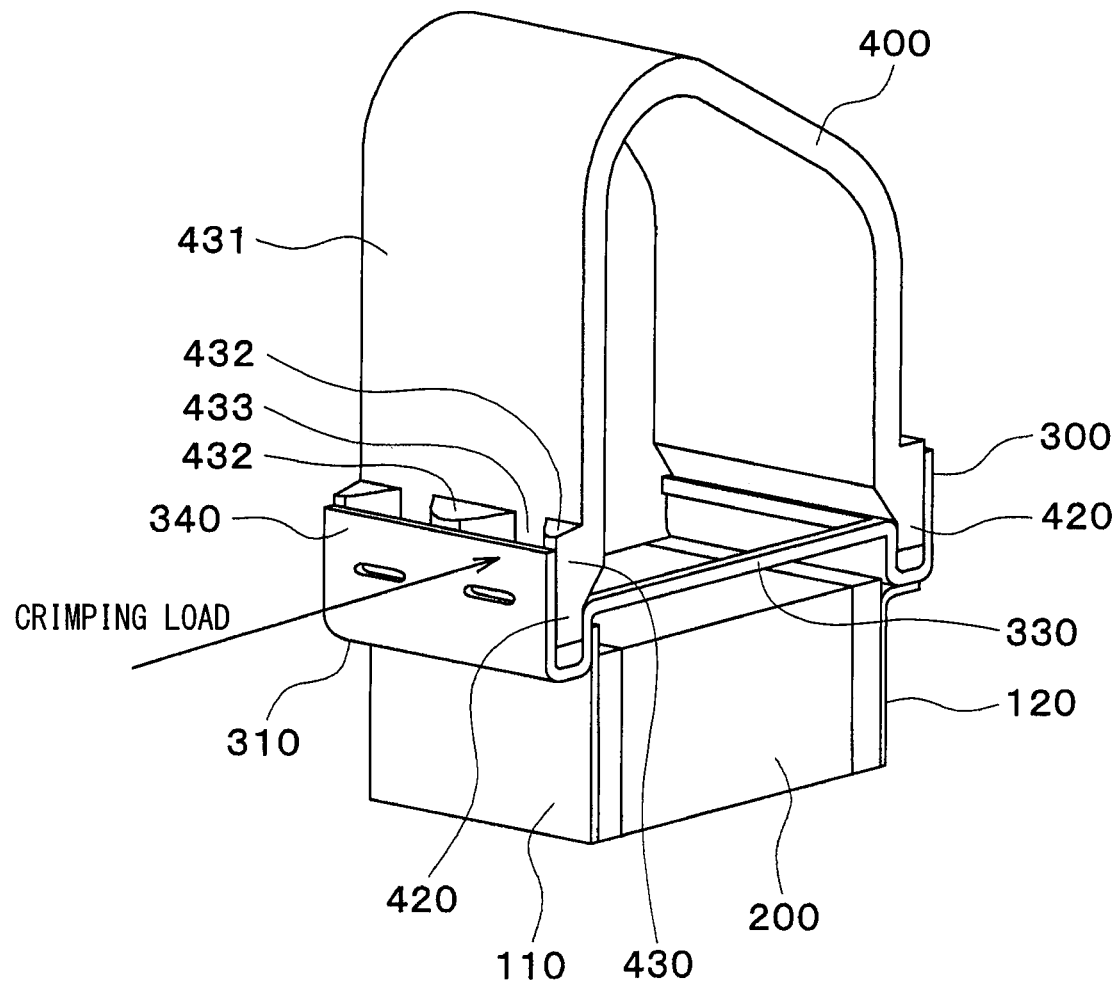
FIG. 9 is a view showing a configuration model for checking a deformation amount of the beam under a crimping load.

Next, effects of the ribs 331 provided to the beams 330 of the crimping plate 300 will be described. When a crimping load is applied to the wave-crimping part 340 to deform the wave-crimping part 340, the crimping load is transferred to the beams 330 via the wave-crimping part 340, the opening 420 of the tank 400, and the inner periphery 320. The inventors analyze, by simulations, a deformation amount of each of the beams 330 when the crimping load is applied to the configuration shown in FIG. 9. Results are shown in FIGS. 10A and 10B.

Figure 10A:
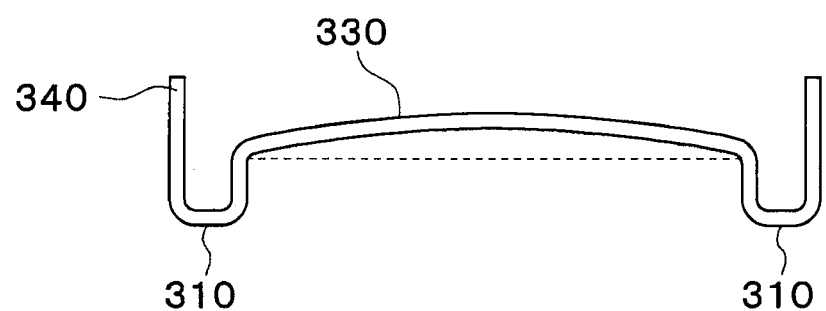
FIG. 10A is a view showing deformation of a beam not provided with ribs.
Figure 10B:
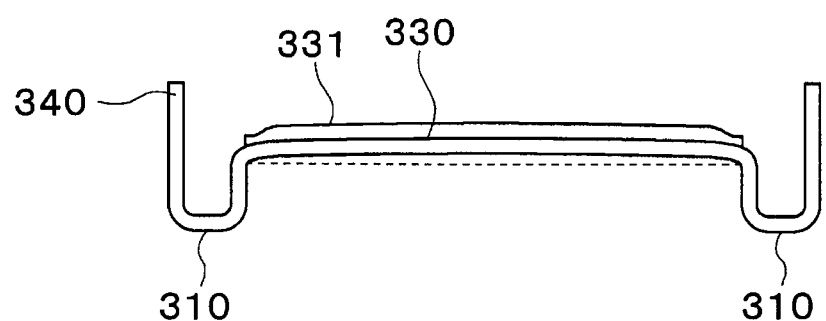
FIG. 10B is a view showing deformation of a beam provided with ribs.

As shown in FIG. 10A, in a case of a configuration having beams 330 without ribs 331, the beams 330 are curved greatly toward the tank 400. On the other hand, as shown in FIG. 10B, in a case of a configuration having beams 330 with ribs 331, the beams 330 are deformed only slightly. A ratio between the deformation amounts of the configuration without the ribs 331 and the configuration with the ribs 331 is 100:18. With the shapes of the ribs 331 higher at centers as shown in FIG. 5, it is possible to obtain a greater deformation suppressing effect.

Since the ribs 331 can increase the modulus of section of each of the beams 330, it is possible to increase rigidity of the beam 330. Therefore, it is possible to make each of the beams 330 less liable to be deformed by the crimping load in the crimping of the tank 400 to the crimping plate 300. Therefore, the deformation of each of the beams 330 can be suppressed by the ribs 331.

When the crimping load is applied to the wave-crimping part 340, a portion of the side wall 311 of the groove 310 near the bottom wall 312 is deformed by the crimping load applied through the opening 420 of the tank 400, thereby pushing the core 200. At this time, if the large crimping load is applied to the wave-crimping part 340, the groove 310 pushes the outer fins 220 positioned at outermost portions. As a result, fin buckling occurs.

However, in the present embodiment, each of the beams 330 of the crimping plate 300 is provided with the ribs 331 and therefore can bear the crimping load. Since the crimping plate 300 itself can suppress deformation toward the core 200 in the crimping, it is possible to suppress the fin buckling. Moreover, it is possible to avoid occurrence of breakage of the cooling plates 210 due to the fin buckling. Therefore, water does not leak from the cooling plates 210, and pressure resistance of the heat exchanger 1 does not reduce.

Figure 11:
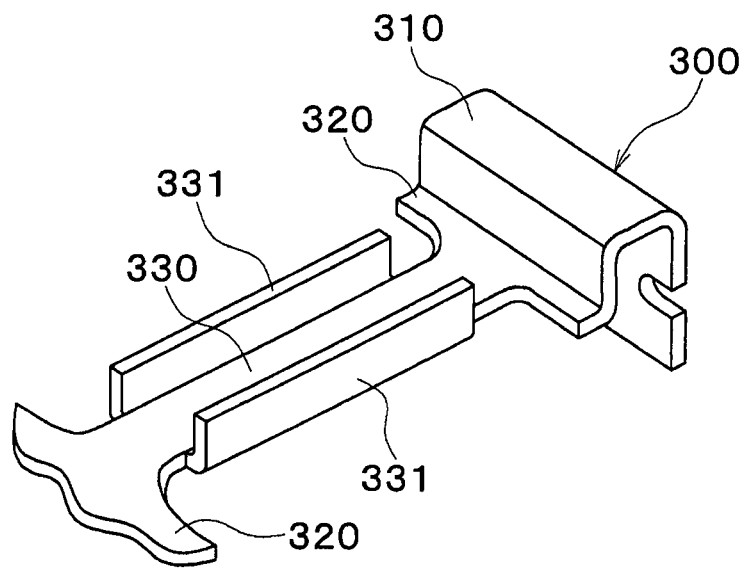
FIG. 11 is a view showing a modification of the beam according to the first embodiment.
Figure 12:
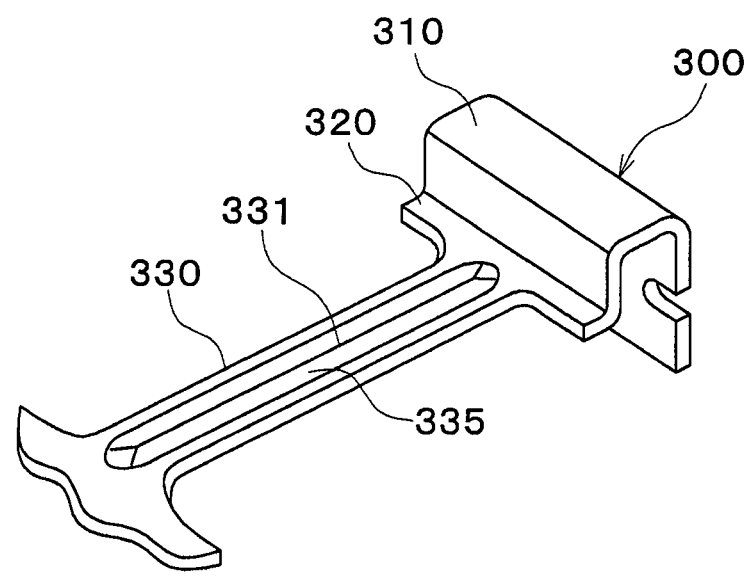
FIG. 12 is a view showing a modification of the beam according to the first embodiment.
Figure 13:
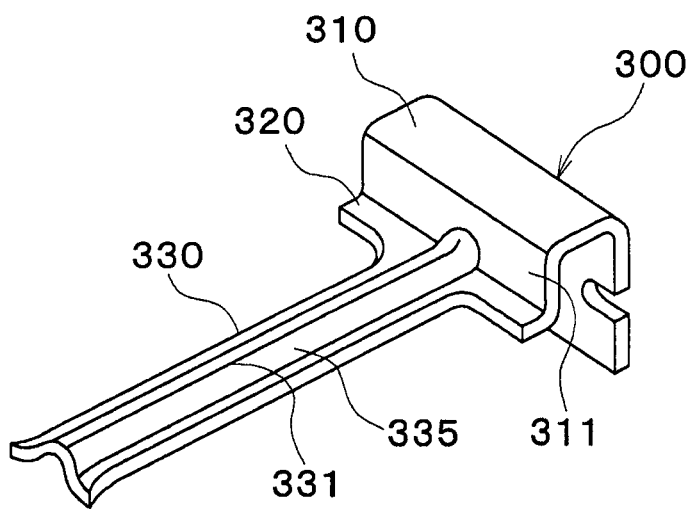
FIG. 13 is a view showing a modification of the beam according to the first embodiment.

As shown in modifications in FIGS. 11 to 13, shapes of ribs 331 can be changed.

As shown in the modification in FIG. 11, the ribs 331 may be provided to each of beams 330 to protrude toward a core 200. The ribs 331 may not have rounded parts 335 and may have constant widths.

On the other hand, as shown in the modification in FIG. 12, the rib 331 may be formed by recessing a center 335 of each of beams 330 toward a tank 400.

As shown in the modification in FIG. 13, the rib 331 may be formed by recessing a center 335 of each of beams 330 toward a core 200, and may be connected to a side wall 311 of a groove 310. In this way, it is possible to increase rigidity of the beam 330. It is needless to say that the rib 331 recessed toward the core 200 need not be connected to the side wall 311 of the groove 310.

Second Embodiment

Figure 14:
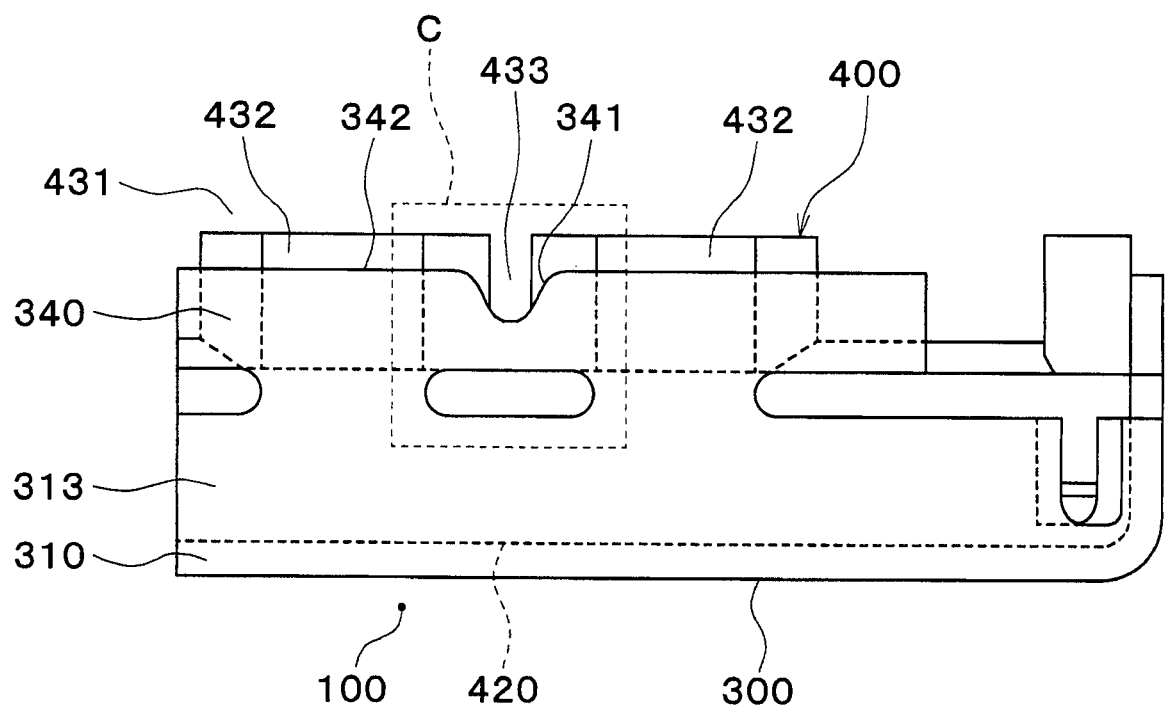
FIG. 14 is a plan view showing a part of a wave-crimping part according to a second embodiment of the present disclosure.

In the present embodiment, portions different from those in the first embodiment will be described. As shown in FIG. 14, a wave-crimping part 340 of each of crimping plates 300 has notches 341. The notches 341 are formed by recessing an edge 342 positioned on an opposite side from a duct 100 (core 200) toward the duct 100 (core 200) at portions corresponding to valleys 433. Each of the notches 341 is formed to have a width of the edge 342 of the wave-crimping part 340 reducing toward the duct 100 (core 200).

Figure 15:
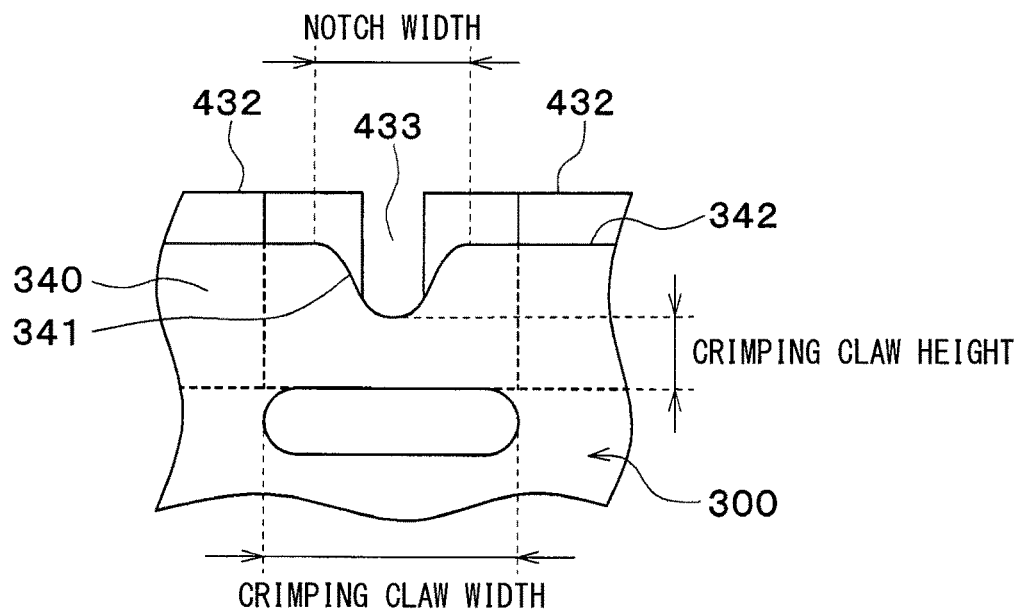
FIG. 15 is a view showing part C in FIG. 14.

As shown in FIG. 15, a crimping claw width is formed at a position corresponding to each of the valleys 433. A notch width of each of the notches 341 is narrower than and within the crimping claw width.

In this way, the portions of the wave-crimping part 340 corresponding to the valleys 433 have crimping claw heights lower than portions corresponding to peaks 432 have. In other words, a length of each of the portions of the wave-crimping part 340 to which a crimping load is applied by the punch 500 is shorter. Since the crimping load is proportional to the crimping claw height, it is possible to reduce the crimping load applied to the crimping claw width in advance by reducing the crimping claw height. For example, when a height of each of the notches 341 is A and a crimping claw height is B, the crimping load reduces to B/(A+B). Therefore, the crimping load becomes less likely to be transferred from the wave-crimping part 340 to beams 330 via an inner periphery 320, which can suppress deformation of the beams 330 under the crimping load. As a result, as in the first embodiment, it is possible to suppress deformation of the core 200 in crimping.

Figure 16:
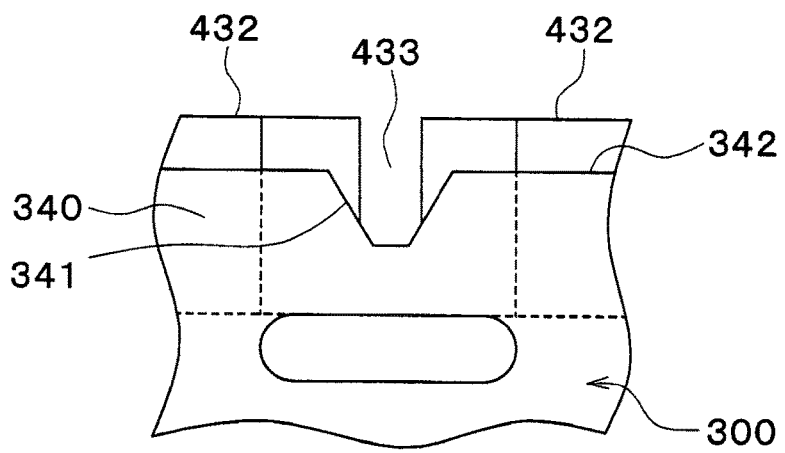
FIG. 16 is a view showing a modification of a notch according to the second embodiment.
Figure 17:
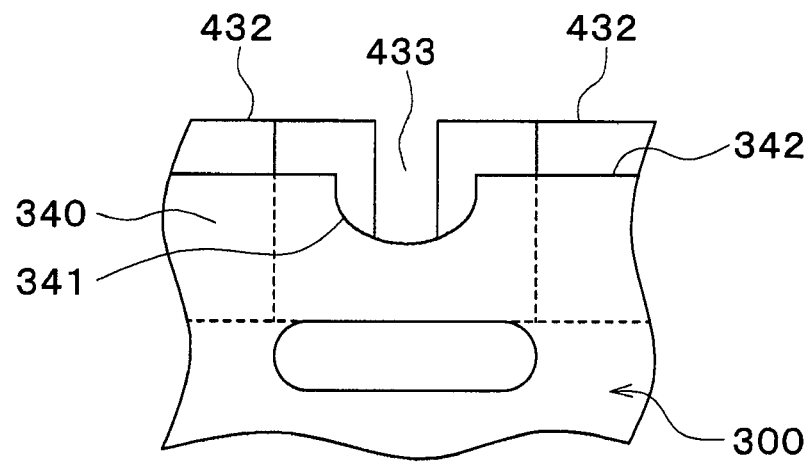
FIG. 17 is a view showing a modification of a notch according to the second embodiment.

As shown in modifications in FIGS. 16 and 17, shapes of notches 341 can be changed. As shown in FIG. 16, each of notches 341 may be formed by cutting out a trapezoidal portion from an edge 342 of a wave-crimping part 340. As shown in FIG. 17, each of the notches 341 may be formed by cutting out a semicircular portion from an edge 342 of a wave-crimping part 340.

Third Embodiment

Figure 18:
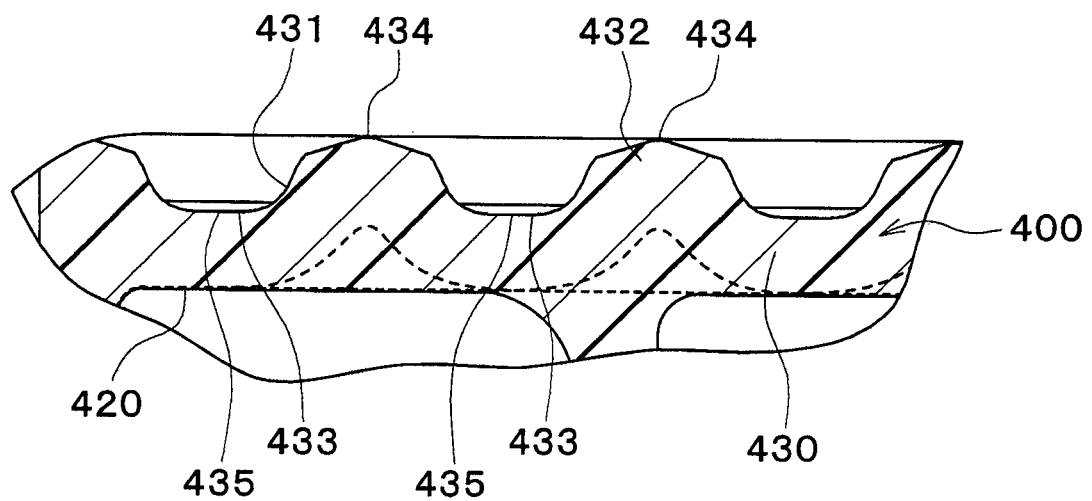
FIG. 18 is a sectional view showing an outer periphery of a tank according to a third embodiment of the present disclosure.

In the present embodiment, portions different from those in the first and second embodiments will be described. As shown in FIG. 18, sectional shapes of peaks 432 of a tank 400 along a plane perpendicular to an opening direction of an opening 420 are pointed at vertexes 434 that come in contact with a wave-crimping part 340. In other words, the vertexes 434 have V-shaped sections. In other words, a radius of a contact part of each of vertexes 434 with the wave-crimping part 340 is small. Here, "pointed" may refer to "angular" or "rounded at a tip end of an angle".

In this way, stress becomes likely to be concentrated on each of portions of the wave-crimping part 340 that come in contact with the vertexes 434 of the peaks 432, and therefore it is possible to make the portions of the wave-crimping part 340 that come in contact with the vertexes 434 of the peaks 432 likely to be deformed. In other words, it is possible to reduce a crimping load applied to the wave-crimping part 340. Therefore, the crimping load becomes less likely to be transferred from the wave-crimping part 340 to beams 330 via an inner periphery 320, which can suppress deformation of the beams 330 provided to a crimping plate 300. Moreover, as in the above-described respective embodiments, it is possible to suppress deformation of a core 200 in crimping.

Other Embodiments

The configurations of the heat exchangers 1 shown in the above-described respective embodiments are examples, and the present disclosure is not limited to the above-described configurations and may be other feasible configurations. Although the heat exchanger 1 is used as the water-cooled intercooler in the example shown in each of the above-described embodiments, the heat exchanger 1 may be used for other purposes, for example.

The rib 331 shown in the first embodiment may be provided to only one of the outer edges 334 of each of the beams 330. The rib 331 provided to one of the outer edges 334 of each of the beams 330 may protrude toward the core 200, and the rib 331 provided to the other of the outer edges 334 of each of the beams 330 may protrude away from the core 200.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A heat exchanger comprising:
a duct configured to receive first fluid through an inlet and emit the first fluid through an outlet;
a core housed in the duct and configured to be capable of exchanging heat between second fluid and the first fluid flowing through the duct;
crimping plates fixed to the inlet and the outlet and having frame shapes corresponding to opening shapes of the inlet and the outlet; and
tanks crimping-fixed to the crimping plates,
wherein:
each of the crimping plates includes a beam connecting two different positions on an inner periphery of the crimping plate;
the beam has a rib protruding in one or both of directions toward and away from the core;
the rib includes a center of the beam being recessed;
each of the crimping plates includes a side wall fixed to an outer wall face of the duct; and
the rib extends to the side wall.

2. The heat exchanger according to claim 1, wherein the rib extends continuously from one end portion to another end portion, the end portions being connected to the inner periphery.

3. The heat exchanger according to claim 1, wherein:
each of the tanks includes an opening that faces the crimping plates, and an outer periphery including peaks and valleys alternately provided on an outer circumferential surface of the opening in a circumferential direction of the opening;
each of the crimping plates has a wave-crimping part covering the outer periphery and having a wave shape in which portions corresponding to the valleys have shapes corresponding to shapes of the valleys, and the wave shape causes the outer periphery to be crimping-fixed; and
sectional shapes of the peaks on a plane perpendicular to a facing direction of the opening are pointed at vertexes that are in contact with the wave-crimping part.

4. A heat exchanger comprising:
a duct configured to receive first fluid through an inlet and emit the first fluid through an outlet;
a core housed in the duct and configured to be capable of exchanging heat between second fluid and the first fluid flowing through the duct;
crimping plates fixed to the inlet and the outlet and having frame shapes corresponding to opening shapes of the inlet and the outlet; and
tanks crimping-fixed to the crimping plates,
wherein:
each of the crimping plates includes a beam connecting two different positions on an inner periphery of the crimping plate;
the beam has a rib protruding in one or both of directions toward and away from the core;
each of the tanks includes an opening that faces the crimping plates, and an outer periphery including peaks and valleys alternately provided on an outer circumferential surface of the opening in a circumferential direction of the opening;
each of the crimping plates has a wave-crimping part covering the outer periphery and having a wave shape in which portions corresponding to the valleys have shapes corresponding to shapes of the valleys, and the wave shape causes the outer periphery to be crimping-fixed; and
the wave-crimping part has an edge facing away from the core, and has a notch recessed from the edge toward the core, the notch being positioned within one of the portions corresponding to the valleys and having a narrower width than a crimping claw width of the portion corresponding to the valley.

5. The heat exchanger according to claim 4, wherein sectional shapes of the peaks on a plane perpendicular to a facing direction of the opening are pointed at vertexes that are in contact with the wave-crimping part.

6. The heat exchanger according to claim 4, wherein the rib extends continuously from one end portion to another end portion, the end portions being connected to the inner periphery.

7. The heat exchanger according to claim 4, wherein the rib includes an outer edge of the beam being bent.

8. The heat exchanger according to claim 7, wherein outer edge has a rounded part curved along a circumferential direction of the inner periphery and connected to the inner periphery.

9. The heat exchanger according to claim 4, wherein the rib includes a center of the beam being recessed.

10. The heat exchanger according to claim 9, wherein:
each of the crimping plates includes a side wall fixed to an outer wall face of the duct; and
the rib extends to the side wall.

11. The heat exchanger according to claim 4, wherein:
each of the tanks includes an opening that faces the crimping plates, and an outer periphery including peaks and valleys alternately provided on an outer circumferential surface of the opening in a circumferential direction of the opening;
each of the crimping plates has a wave-crimping part covering the outer periphery and having a wave shape in which portions corresponding to the valleys have shapes corresponding to shapes of the valleys, and the wave shape causes the outer periphery to be crimping-fixed; and
sectional shapes of the peaks on a plane perpendicular to a facing direction of the opening are pointed at vertexes that are in contact with the wave-crimping part.

* * * * *